(12) United States Patent
Baker et al.

(10) Patent No.: US 9,154,200 B2
(45) Date of Patent: *Oct. 6, 2015

(54) EFFICIENT CQI SIGNALING IN MULTI-BEAM MIMO SYSTEMS

(71) Applicants: KONINKLIJKE PHILIPS N.V., Eindhoven (NL); Sharp Corporation, Osaka (JP)

(72) Inventors: Matthew Peter John Baker, Canterbury (GB); Timothy James Moulsley, Caterham (GB)

(73) Assignees: Koninklijke Philips N.V., Eindhoven (NL); Sharp Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/055,975

(22) Filed: Oct. 17, 2013

(65) Prior Publication Data

US 2014/0044210 A1 Feb. 13, 2014

Related U.S. Application Data

(63) Continuation of application No. 12/438,158, filed as application No. PCT/IB2007/053284 on Aug. 17, 2007, now Pat. No. 8,588,116.

(30) Foreign Application Priority Data

Aug. 21, 2006 (EP) ...................................... 06119254
Aug. 22, 2006 (EP) ...................................... 06119326

(51) Int. Cl.
| | |
|---|---|
| *H04B 7/00* | (2006.01) |
| *H04B 7/04* | (2006.01) |
| *H04B 7/06* | (2006.01) |
| *H04L 5/00* | (2006.01) |
| *H04L 1/00* | (2006.01) |

(52) U.S. Cl.
CPC ............ *H04B 7/0413* (2013.01); *H04B 7/0617* (2013.01); *H04B 7/0632* (2013.01); *H04B 7/0639* (2013.01); *H04L 1/0027* (2013.01); *H04L 1/0029* (2013.01); *H04L 5/006* (2013.01); *H04L 1/0002* (2013.01)

(58) Field of Classification Search
CPC .. H04B 7/0413; H04B 7/0617; H04B 7/0632; H04B 7/0639; H04L 1/0002; H04L 1/0027; H04L 5/006
USPC ......... 370/465, 437, 310, 203; 455/562.1, 69, 455/101; 375/267
See application file for complete search history.

(56) References Cited

U.S. PATENT DOCUMENTS

| | | | |
|---|---|---|---|
| 6,094,418 | A | 7/2000 | Soumiya et al. |
| 2004/0014429 | A1 | 1/2004 | Guo |
| 2004/0042427 | A1 | 3/2004 | Hottinen |
| 2005/0064872 | A1 | 3/2005 | Osseiran et al. |
| 2005/0201296 | A1 | 9/2005 | Vannithamby et al. |
| 2006/0023624 | A1 | 2/2006 | Han et al. |
| 2006/0072677 | A1 | 4/2006 | Kwak et al. |
| 2007/0298728 | A1 | 12/2007 | Imamura et al. |

FOREIGN PATENT DOCUMENTS

| | | |
|---|---|---|
| WO | 0215432 A1 | 2/2002 |
| WO | 03023995 A1 | 3/2003 |
| WO | 2005091541 A2 | 9/2005 |
| WO | 2006028204 A1 | 3/2006 |
| WO | 2005055507 A1 | 6/2006 |

OTHER PUBLICATIONS

"Physical Channels and Multiplexing in Evolved Utra Downlink", NTT DoCoMO, NEC, Sharp, 3GPP TSG RAN WG1 #42 on LTE, R1-050707, Sep. 2005.
"Description and Link Simulations of MIMO Schemes for OFDMA Based E-Utra Downlink Evaluation", Qualcomm Europe, 3GPP TSG-RAN WG1 #42, RE-050903, Sep. 2005.
"AMC and HARQ Using Frequency Domain Channel-Dependent Scheduling in MIMO Channel Transmission", NTT DoCoMo, NEC, Sharp, 3GPP TSG RAN WG1 #42 on LTE, R1-050942, Sep. 2, 2005.

*Primary Examiner* — Dady Chery

(57) ABSTRACT

The present invention relates to the signaling of channel quality information in a multi-beam transmission system, wherein a plurality of beams are simultaneously transmitted and a plurality of sets of channel quality information are transmitted for controlling independently the transmission rate on the different beams. Determined are beams with a different quality resulting in different effects of errors in the transmissions of the channel quality information for the beams. Said different effects are exploited for reducing a signaling overhead of the channel quality information for the beams.

40 Claims, No Drawings

EFFICIENT CQI SIGNALING IN MULTI-BEAM MIMO SYSTEMS

The present invention relates to a method for signaling channel quality information in a multi-beam transmission system, in particular a multi-beam MIMO (multiple-in/multiple-out) system. Moreover, the present invention relates to a computer program product for carrying out the method. Further, the present invention relates to a multi-beam transmission system, in particular a multi-beam MIMO system, wherein a plurality of beams are simultaneously transmitted and a plurality of sets of channel quality information (CQI) are transmitted for controlling independently the transmission rate on the different beams. Still further, the present invention relates to a network element, in particular a node, in a multi-beam transmission system, in particular a multi-beam MIMO system, wherein a plurality of beams are simultaneously transmitted and a plurality of sets of channel quality information are transmitted for controlling independently the transmission rate on the different beams. Still further, the present invention relates to a user equipment, in particular a mobile station, in a multi-beam transmission system, in particular a multi-beam MIMO system, wherein a plurality of beams are simultaneously transmitted and a plurality of sets of channel quality information are transmitted for controlling independently the transmission rate on the different beams. Finally, the present invention relates to a signal for indicating channel quality information in a multi-beam transmission system, in particular a multi-beam MIMO system, wherein a plurality of beams are simultaneously transmitted and a plurality of sets of channel quality information are transmitted for controlling independently the transmission rate on the different beams.

The present invention can be applied in multi-antenna communication systems. In particular, a potential application of the present invention is in the MIMO feature currently being standardized for UMTS (universal mobile telecommunication system) Release 7.

In the third generation partnership project (3GPP) a proposal called D-TxAA is under discussion for UMTS as a way of increasing the peak bit rate. This is derived from an existing closed loop transmit diversity scheme (TxAA mode 1) where the mobile terminal signals to the network complex weights which should be applied to the signals from each of two transmitting antennas. In D-TxAA two different data streams are transmitted using orthogonal weight vectors, wherein a first weight vector is based on those transmitted from the mobile terminal, and a second vector is derived deterministically from the first vector.

For the operation of D-TxAA, the following may be assumed:

Orthogonal pilot channels are transmitted from an antenna of each Node B (which is a logical node responsible for radio transmission and reception in one or more cells to and from an user equipment (UE).

No dedicated (i.e. beam formed) pilots are available (assuming that the fractional dedicated physical channel (F-DPCH) is used, which does not carry pilot bits).

Feedback information (FBI) for the first beam is derived by the user equipment (UE) and transmitted to Node B, indicating the desired beamforming vector.

The first beam is transmitted using a restricted codebook of weight vectors (for example the codebook currently used for TxAA mode 1).

The identity of the antenna weight vector for a first beam is signaled to the UE on the High-Speed Shared Control Channel (HS-SCCH).

The second beam is transmitted using a deterministic phase vector, which is orthonormal to the vector for the first beam.

Channel quality information (CQI) is signaled by the UE to the Node B, enabling the Node B to derive a different rate for each of the two beams.

The CQI indicates the rate (or packet size) which can be transmitted successfully (or with a given probability of success) using a reference power level and code resource (the reference values being known by both the network and the mobile terminal).

The transmissions on the two beams are comprised of separate codewords with potentially different rates.

As the simultaneously transmitted beams in D-TxAA are typically received with different SINR (signal-to-noise ratio where the noise includes both thermal noise and interference) at the UE, each beam can support a correspondingly different rate. This implies that multiple CQI information is required to be signaled to the Node B by each UE. In UMTS Release 5, a single CQI value is comprised of 5 information bits, coded into 20 physical channel bits. For a multiple-beam system, this number of bits would be multiplied by the number of beams if a separate CQI value is indicated for every beam. This can result in a high signaling load.

An object of the present invention is to reduce the CQI signaling load in multi-beam systems.

In order to achieve the above and further objects, in accordance with a first aspect of the present invention, there is provided a method for signaling channel quality information in a multi-beam transmission system, in particular a multi-beam MIMO system, wherein a plurality of beams are simultaneously transmitted and a plurality of sets of channel quality information are transmitted for controlling independently the transmission rate on the different beams, comprising the steps of determining beams with different quality, and exploiting said different qualities for reducing a signaling overhead of the channel quality information for the beams.

In accordance with a second aspect of the present invention, there is provided a computer program for carrying out the method according to the first aspect of the present invention.

In accordance with a third aspect of the present invention, there is provided a multi-beam transmission system, in particular a multi-beam MIMO system, wherein a plurality of beams are simultaneously transmitted and a plurality of sets of channel quality information are transmitted for controlling independently the transmission rate on the different beams, comprising a determining device for determining beams with different quality, and an exploiting device for exploiting said different qualities for reducing a signaling overhead of the channel quality information for the beams.

In accordance with a fourth aspect of the present invention, there is provided a network element, in particular a node, in a multi-beam transmission system, in particular a multi-beam MIMO system, wherein a plurality of beams are simultaneously transmitted and a plurality of sets of channel quality information are transmitted for controlling independently the transmission rate on the different beams, comprising a determining device for determining beams with different quality, and an exploiting device for exploiting said different qualities for reducing a signaling overhead of the channel quality information for the beams.

In accordance with a fifth aspect of the present invention, there is provided a user equipment, in particular a mobile station, in a multi-beam transmission system, in particular a multi-beam MIMO system, wherein a plurality of beams are simultaneously transmitted and a plurality of sets of channel quality information are transmitted for controlling independently the transmission rate on the different beams, comprising a determining device for determining beams with different quality, and an exploiting device for exploiting said different qualities for reducing a signaling overhead of the channel quality information for the beams.

In accordance with a sixth aspect of the present invention, there is provided a signal for indicating channel quality information in a multi-beam transmission system, in particular a multi-beam MIMO system, wherein a plurality of beams are simultaneously transmitted and a plurality of sets of channel quality information are transmitted for controlling independently the transmission rate on the different beams, the signal comprising a reduced overhead of channel quality information for the beams, based on exploiting differences in qualities of the beams.

The present invention leads to a reduction of the CQI signaling load in multi-beam transmission systems. This advantage is achieved in particular by that according to the present invention the different effects of errors in the CQI transmissions for the different beams which effects result from different quality of the beams are exploited for using signaling overhead of CQI for the multiple beams.

Further advantageous embodiments are defined in the dependent claims.

Preferably, said determining device is adapted to determine beams with different quality resulting in different effects of errors in the transmissions of the channel quality information for the beams, and in particular said determining device is adapted to determine a primary beam with a higher quality and at least one secondary beam with a lower quality in the plurality of beams resulting in different effects of errors in the channel quality information transmissions for the secondary beam(s).

There may be a differential signaling device for providing a differential signaling for indicating the channel quality information value for the secondary beam(s). The differential signaling device may be adapted to signal an absolute value of the channel quality information for the primary beam, and the channel quality information values for the secondary beam(s) by means of an offset relative to the value for the primary beam. Further, the differential signaling device may be adapted to derive the offset from an average difference in quality between the respective secondary beam and the primary beam.

Preferably, the exploiting device may be adapted to provide different update rates for the channel quality information for different beams, wherein the differential signaling device may be adapted to signal the offset at a lower update rate than the absolute channel quality information value for the primary beam. Further, the exploiting device may be adapted to provide a lower update rate for the channel quality information transmissions relating to the secondary beam(s) compared to the update rate for the channel quality information transmissions relating to the primary beam. The update rates may be signaled from a network element, in particular a node, to a user equipment, and may be predetermined.

Preferably, the exploiting device is adapted to provide different cut-off thresholds, below which a reporting of channel quality information is not required, for different beams, and in particular the exploiting device is adapted to provide a higher cut-off threshold for the secondary beam(s) than for the primary beam. The cut-off thresholds may be signaled from a network element, in particular a node, to a user equipment, and may be predetermined. Further, scheduled time instants are provided for the user equipment to transmit channel quality information to the network element, and when user equipment estimates that the channel quality for a beam is below the respective cut-off threshold for that beam, the user equipment does not transmit channel quality information at the scheduled time instants until the channel quality is above the respective cut-off threshold. Moreover, according to a preferred embodiment, wherein when the network element does not receive channel quality information at a scheduled time instant it does not make any further transmissions on the respective beam(s) until it receives a different channel quality information value from the user equipment.

Preferably, the exploiting device is adapted to provide different channel quality information quantization granularities for different beams. The exploiting device may be adapted to provide a coarser channel quality information quantization granularity for the secondary beam(s) compared to the channel quality information quantization granularity applied to the channel quality information reports for the primary beam. Further, the exploiting device may be adapted to apply the coarser channel quality information quantization granularity for the secondary beam(s) only to a lower part of the channel quality information range. A network element, in particular a node, may be provided to instruct a user equipment to use different channel quality information quantization granularities for different beams. Still further, the channel quality information quantization granularities may be predetermined.

Preferably, an encoding device is provided for jointly encoding the channel quality information values transmitted for more than one beam into a single codeword for transmission from a user equipment to a network element, in particular a node.

It is recognized that in D-TxAA systems a first beam is typically always of better quality than a second beam as the beam forming weights for the first beam are specifically designed to optimize the signal-to-interference ratio (SIR) of the first beam, while the beam forming weights for the second beam are derived deterministically from the first beam.

In general, multi-beam transmission systems can be considered to be comprised of a primary beam with an optimized SIR and one or more secondary beams with a lower SIR.

Consequently, the effect of errors in the CQI signaling for the secondary beam(s) is considered to be less significant than the effect of errors in the CQI signaling for the primary beam, when considering the total achievable transmission rate over all the beams. This results in a different effect of errors in the CQI transmissions for the secondary beam(s).

Therefore, at first, a primary beam and one or more secondary beams are determined among the multiple beams.

Then, the different effects of errors in the CQI transmissions for the secondary beam(s) are exploited for reducing a signaling overhead of CQI for the multiple beams.

Preferably, the exploiting of the different effects can include one or more of the following three measures or steps:

1. A different (typically lower) update rate is provided for the CQI transmissions relating to at least one secondary beam compared to the update rate for the CQI transmissions relating to the primary beam. These update rates are signaled to the UE by the Node B. In a typical embodiment, a rate of CQI reporting is signaled for the primary beam, and one or more further (advantageously lower) update rates are signaled for one or more secondary beams. In some embodiments, the one or more further update rates may be signaled by means of a divisor of the rate signaled for the primary beam. In a variation of this embodiment, the update rate for CQI transmissions is optionally selected depending upon the rate of change of the channel on each beam.

2. A different (typically higher) cut-off threshold is provided for one or more beams, below which the UE should not report CQI values for the respective beams. In the prior art, an "out-of-range" CQI value is provided for transmission by the UE when the SIR is too low for the UE successfully to decode any of the available transmission formats. However, transmission of such a value continues to contribute to an uplink signaling overhead, even when no data can be received on the downlink. In order to reduce the signaling overhead, the Node B signals to the UE a cut-off CQI level for one or more beams, below which the UE ceases to report CQI for that beam, and the Node B makes no further transmissions on such beams until it receives from the UE another CQI value. In a variation of this embodiment particularly suited to cases where a fixed number of bits is allocated in the uplink signaling channel for CQI reporting purposes, the proportion of the fixed number of uplink bits available for CQI reports is varied according to beam quality, such that when one or more beams have an "out of range" CQI and hence no CQI report is sent, more CQI bits for the "in range" beam(s) may be sent instead to improve their quantization and/or reliability.

3. A different (typically coarser) CQI quantization granularity is provided for at least one secondary beam compared to the CQI quantization granularity applied to the CQI reports for the primary beam. If the rate of the secondary beam(s) is lower and therefore the total rate is less sensitive to errors in the CQI for the secondary beam(s), it is more efficient to coarsen the granularity of the CQI reporting for those beams whereby the number of required signaling bits is reduced. For example, while a 1 dB granularity is typically applied for a primary beam, the Node B might use signaling to instruct the UE to use a coarser granularity (e.g. 2 dB) for one or more secondary beams. Alternatively, the granularities could be predetermined in the specification. In a further embodiment, the coarser granularity for a secondary beam could apply only to a lower part of the CQI range. In a variation of this embodiment, the range of CQI values to be transmitted for the secondary beam(s) may be different from the range of CQI values to be transmitted for the primary beam; the granularity for each beam may optionally then be the same. For example, the total range of possible CQI values could be split into a number of sub-ranges, and a UE would signal only a CQI value within a beam's current sub-range. In an extension of this embodiment, special CQI values could be reserved to indicate switching up or down to the next sub-range of CQI values. Sub-ranges might further be designed to overlap, or be extended or reduced or otherwise adapted by further signaling in order to optimize them for the current beams and channel conditions.

In any of the embodiments, the CQI values transmitted for more than one beam can be jointly encoded into a single codeword for transmission to the Node B.

Differential signaling may be used to indicate the CQI value for one or more secondary beams. For example, an absolute value of CQI may be signaled for the primary beam, and the CQI values for one or more secondary beams may be signaled by means of an offset relative to the value for the primary beam. In particular, the offset can be signaled at a lower update rate than the absolute CQI value for the primary beam. In further embodiments, the offset can be derived from an average difference in quality between the respective secondary beam and the primary beam, wherein the averaging period can be e.g. related to the update rate of the primary beam CQI value, related to the update rate of the offset, predetermined, signaled to the UE by the Node B, or signaled to the Node B by the UE.

Such a difference in CQI may be in terms of a transmission power offset which is required between a secondary beam and the primary beam, assuming that both beams would be transmitted with the same modulation and coding scheme. Alternatively the difference in CQI may be in terms of a transmission power offset required under the assumption that the secondary beam is transmitted with a fixed difference (or ratio) in the data rate relative to the primary beam.

Differential signaling for CQI is typically advantageous if the CQI values of different beams are correlated to a certain extent. In a variation of the embodiments using differential signaling, the UE therefore measures and subtracts the correlated part of the CQI values of the different beams and transmits only a value relating to the non-correlated part of the CQI for secondary beam(s) relative to a primary beam. The period over which the correlation is measured can be selected in a similar way to the averaging period.

Although the invention has been described primarily in relation to transmissions from base stations to mobile terminals, the invention is also applicable to transmissions from mobile terminals to base stations, and between peer nodes.

In the present specification and claims the word "a" or "an" preceding an element does not exclude the presence of a plurality of such elements. Further, the word "comprising" does not exclude the presence of other elements or steps than those listed.

From reading the present disclosure, other modifications will be apparent to persons skilled in the art. Such modifications may involve other features which are already known in the art of radio communication and which may be used instead of or in addition to features already described herein.

The invention claimed is:

1. A method for signaling channel quality information in a multi-beam transmission system, the system comprising a Node B and a user equipment (UE) in communication with the Node B, wherein one or more beams are simultaneously transmitted between the Node B and the user equipment (UE) and one or more sets of channel quality information (CQI) are transmitted for controlling independently the transmission rate on the different beams, comprising the steps of:
 determining in the multi-beam transmission system, different beams with different channel qualities by identifying a primary beam with an optimized signal-to-interference ratio (SIR) and at least one secondary beam with a lower signal-to-interference (SIR) relative to the optimized SIR of the primary beam; and
 exploiting the different channel qualities for the different beams for reducing a signaling overhead of the channel quality information (CQI) for the different beams by:
 providing more bits in a CQI reported for the primary beam in the case where the CQI is not reported for the at least one secondary beam with a lower SIR, and
 providing less bits in a CQI reported for the primary beam in the case where the CQI is reported for the at least one secondary beam with a lower SIR.

2. The method according to claim 1, wherein the step of exploiting the different channel qualities results in different transmission errors in the transmissions of the channel quality information for the primary and at least one secondarybeam.

3. The method according to claim 1, wherein a differential signaling is used to indicate the channel quality information value for the at least one secondary beam.

4. The method according to claim 3, wherein an absolute value of the channel quality information (CQI) is signaled for the primary beam, and the channel quality information values for the at least one secondary beam are signaled as an offset relative to the absolute value for the primary beam.

5. The method according to claim 4, wherein the offset is derived from an average difference in quality between the respective at least one secondary beam and the primary beam.

6. The method according to claim 4, wherein the offset is signaled at a lower update rate than the update rate for the absolute channel quality information value for the primary beam.

7. The method according to claim 1, wherein different update report rates for the channel quality information (CQI) are provided for the different beams.

8. The method according to claim 7, wherein the channel quality information (CQI) transmissions are signaled at a lower update rate for the at least one secondary beam relative to the update rate for the channel quality information (CQI) transmissions the primary beam.

9. The method according to claim 7, wherein the update rates are signaled from the network element to the user equipment (UE).

10. The method according to claim 7, wherein the update rates are predetermined.

11. The method according to claim 1, wherein different cut-off thresholds of channel quality are provided for the different beams, the different cut-off thresholds defining a level below which a reporting of channel quality information (CQI) is not required.

12. The method according to claim 11, wherein a higher cut-off threshold is provided for the at least one secondary beam than for the primary beam.

13. The method according to claim 11, wherein the different cut-off thresholds are signaled from the network element, to the user equipment (UE).

14. The method according to claim 11, wherein the cut-off thresholds are predetermined.

15. The method according to claim 11, wherein scheduled time instants are provided for the user equipment to transmit channel quality information (CQI) to the network element.

16. The method according to claim 11, wherein when the network element does not receive channel quality information at a scheduled time instant it does not make any further transmissions on the different beams until it receives a different channel quality information value from the user equipment.

17. The method according to claim 11, wherein when the user equipment estimates that the channel quality for a beam is below the respective cut-off threshold for that beam, the user equipment does not transmit channel quality information at the scheduled time instants until the channel quality is above the respective cut-off threshold.

18. The method according to claim 1, wherein different channel quality information quantization granularities are provided for the different beams.

19. The method according to claim 18, wherein the network element instructs the user equipment to use different channel quality information quantization granularities for different beams.

20. The method according to claim 18, wherein the channel quality information quantization granularities are predetermined.

21. The method according to claim 1, wherein a coarser channel quality information quantization granularity is provided for the at least one secondary beam compared to the channel quality information quantization granularity applied to the channel quality information (CQI) reports for the primary beam.

22. The method according to claim 21, wherein the coarser channel quality information quantization granularity for the at least one secondary beam only applies to a lower part of the channel quality information range.

23. The method according to claim 1, wherein the channel quality information values transmitted for more than one beam are jointly encoded into a single codeword for transmission from a user equipment to a network element.

24. A tangible computer-readable storage medium that is not a transitory propagating signal or wave, the medium having instructions when executed by a processor performs the acts of:
  determining different beams with different channel qualities by:
    identifying a primary beam in the multi-beam transmission system with an optimized signal-to-interference ratio (SIR) and,
    identifying at least one secondary beam with a lower signal-to-interference (SIR) relative to the SIR of the primary beam with the optimized SIR; and
  exploiting the different channel qualities for reducing a signaling overhead of the channel quality information (CQI) for the different beams with the different channel qualities by providing more bits in a CQI reported for the primary beam when the CQI is not reported for at least one secondary beam with the lower SIR, and providing relatively less bits in the CQI reported for the primary beam when the CQI is reported for the at least one secondary beam with a lower SIR,
  wherein one or more beams are simultaneously transmitted and one or more sets of channel quality information (CQI) are transmitted for independently controlling the transmission rate on the different beams.

25. A multi-beam transmission system wherein a primary beam and at least one secondary beam are simultaneously transmitted and one or more sets of channel quality information are transmitted for independently controlling the transmission rate on the primary beam and the at least one secondary beam, the system comprising:
  a determining device for determining the primary beam and the at least one secondary beam in accordance with the respective beams different channel qualities, wherein the primary beam has an associated optimized SIR and the at least one secondary beam has a lower SIR relative to the optimized SIR of the primary beam; and
  a reducing device for reducing a signaling overhead of the channel quality information for the beams by providing more bits in the CQI for the primary beam when the CQI is not reported for the at least one secondary beam with a lower SIR, and providing less bits in the CQI for the primary beam when the CQI is reported for the at least one secondary beam with a lower SIR.

26. The multi-beam transmission system as claimed in claim 25, wherein the multi-beam transmission system is a MIMO system.

27. A network element in a multi-beam transmission system, network element comprising:
  a determining device for determining the primary beam and the at least one secondary beam in accordance with the respective beams different channel qualities, wherein the primary beam has an associated optimized SIR and the at least one secondary beam has a lower SIR relative to the optimized SIR of the primary beam; and
  a reducing device for reducing a signaling overhead of the channel quality information for the beams by providing more bits in the CQI for the primary beam when the CQI is not reported for the at least one secondary beam with a lower SIR, and providing less bits in the CQI for the primary beam when the CQI is reported for the at least one secondary beam with a lower SIR.

28. A base station in a multi-beam transmission system, wherein a transmitting end is a Node B and a receiving end is a UE, wherein one or more beams are simultaneously transmitted and one or more sets of channel quality information are transmitted for controlling independently the transmission rate on the different beams, comprising:
- a determining device for determining a primary beam and at least one secondary beam in accordance with the respective beams different channel qualities, wherein the primary beam has an associated optimized SIR and the at least one secondary beam has a lower SIR relative to the optimized SIR of the primary beam; and
- an exploiting device for exploiting the different channel qualities for the different beams for reducing a signaling overhead of the channel quality information (CQI) for the different beams by providing more bits in a CQI reported for the primary beam in the case where the CQI is not reported for the at least one secondary beam with a lower SIR, and otherwise providing less bits in a CQI reported for the primary beam in the case where the CQI is reported for the at least one secondary beam with the lower SIR.

29. A user equipment, in a multi-beam transmission system, wherein one or more beams are simultaneously transmitted and one or more sets of channel quality information are transmitted for controlling independently the transmission rate on the different beams, comprising:
- a determining device for determining different beams with different channel qualities by identifying a primary beam in the multi-beam transmission system with an optimized SIR and at least one secondary beam with a lower SIR relative to the SIR of the beam with the optimized SIR; and
- an exploiting device for exploiting the different channel qualities for reducing a signaling overhead of the channel quality information for the beams by providing that when the CQI is not reported for at least one secondary beam with a lower SIR, the CQI reported for the primary beam comprises more bits than when CQI is reported for said secondary beam with a lower SIR.

30. A method for signaling channel quality information in a multi-beam transmission system, wherein one or more beams are simultaneously transmitted and one or more sets of channel quality information are transmitted for controlling independently the transmission rate on the different beams, the method comprising the steps of:
- determining in the one or more beams, different beams with different channel qualities by identifying a primary beam in said multi-beam transmission system with a higher channel quality and at least one secondary beam with a different lower channel quality; and
- exploiting said lower and higher channel qualities for reducing a signaling overhead of the channel quality information for the beams by providing that when the CQI is not reported for at least one secondary beam with a lower SIR, the CQI reported for the primary beam comprises more bits than when CQI is reported for said secondary beam with a lower SIR.

31. The method according to claim 30, wherein the offset is signaled at a lower update rate than the absolute channel quality information value for the primary beam.

32. The method according to claim 31, wherein a lower update rate for the channel quality information transmissions relating to at least one secondary beam is provided compared to the update rate for the channel quality information transmissions relating to the primary beam.

33. The method according to claim 30, wherein for different beams, different cut-off thresholds are provided, below which a reporting of channel quality information is not required, and wherein a higher cut-off threshold is provided for at least one secondary beam than for the primary beam.

34. The method according to claim 33, wherein the cut-off thresholds are signaled from a network element to a user equipment, and wherein scheduled time instants are provided for the user equipment to transmit channel quality information to the network element, and when the user equipment estimates that the channel quality for a beam is below the respective cut-off threshold for that beam, the user equipment does not transmit channel quality information at the scheduled time instants until the channel quality is above the respective cut-off threshold.

35. The method according to claim 33, wherein the cut-off thresholds are signaled from a network element to a user equipment, and wherein when the network element does not receive channel quality information at a scheduled time instant it does not make any further transmissions on the respective beam(s) until it receives a different channel quality information value from the user equipment.

36. The method according to claim 30, wherein a coarser channel quality information quantization granularity is provided for the secondary beam(s) compared to the channel quality information quantization granularity applied to the channel quality information reports for the primary beam.

37. A tangible computer-readable storage medium that is not a transitory propagating signal or wave, having instructions when executed by a processor performs the acts of:
- determining in the one or more beams, different beams with different channel qualities by identifying a primary beam in said multi-beam transmission system with a higher channel quality and at least one secondary beam with a different lower channel quality; and
- exploiting said lower and higher channel qualities for reducing a signaling overhead of the channel quality information for the beams by providing that when the CQI is not reported for at least one secondary beam with a lower SIR, the CQI reported for the primary beam comprises more bits than when CQI is reported for said secondary beam with a lower SIR.

38. A multi-beam transmission system, wherein one or more beams are simultaneously transmitted and one or more sets of channel quality information (CQI) are transmitted for controlling independently the transmission rate on the different beams, the multi-beam transmission system comprising:
- a determining device in a network element for determining in the one or more beams, a primary beam with a higher channel quality and at least one secondary beam with a lower channel quality; and
- a reducing device in the network element for reducing a signaling overhead of the channel quality information for the beams based on said higher and lower channel qualities by providing in the case where the CQI is not reported for the at least one secondary beam with a lower SIR, the CQI reported for the primary beam comprises more bits, and further providing in the case where the CQI is reported for the at least one secondary beam with a lower SIR, the CQI reported for the primary beam comprises less bits.

39. A multi-beam transmission system according to claim 38, wherein the network element is a base station.

40. A user equipment for a multi-beam transmission system as claimed in claim 38.

* * * * *